P. DORSEY.
SIGNALING DEVICE.
APPLICATION FILED SEPT. 3, 1915.
1,226,755.
Patented May 22, 1917.
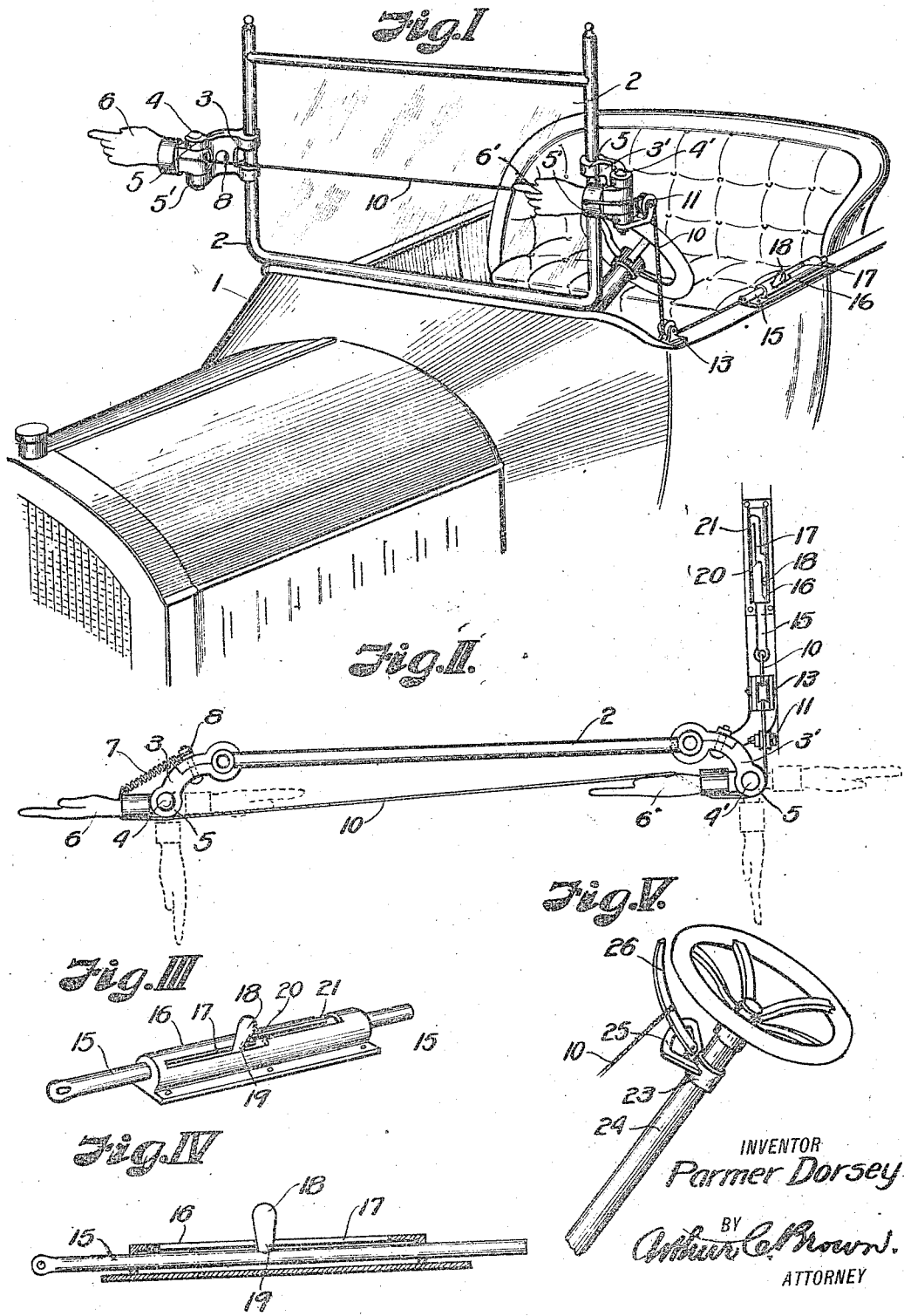
INVENTOR
Parmer Dorsey
BY
Arthur C. Brown.
ATTORNEY

UNITED STATES PATENT OFFICE.

PARMER DORSEY, OF HUTCHINSON, KANSAS.

SIGNALING DEVICE.

1,226,755.

Specification of Letters Patent.   Patented May 22, 1917.

Application filed September 3, 1915.   Serial No. 48,908.

*To all whom it may concern:*

Be it known that I, PARMER DORSEY, a citizen of the United States, residing at Hutchinson, in the county of Reno and State of Kansas, have invented certain new and useful Improvements in Signaling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to a direction indicator for automobiles and has for its principal object to provide a signaling device whereby the driver of an automobile may indicate to a crossing officer, to other drivers, either in front of or behind his own vehicle, or to pedestrians, when he is to turn a corner, and the direction in which he is about to turn.

It is also an object of the invention to provide an indicating device which is simple both in construction and operation, which may be mounted on the wind shield or other part of the automobile, and which may be operated by a mechanism attached to any convenient portion of the vehicle.

In accomplishing this object I have provided improved details of structure, the preferred form of which is illustrated in the accompanying drawing, wherein:
Figure I is a perspective view of an automobile equipped with an indicator constructed according to my invention.

Fig. II is a plan view of the indicator, illustrating its attachment to a wind shield.
Fig. III is a detail perspective view of the operating device.

Fig. IV is a central, longitudinal section of the same.

Fig. V is a detail perspective view of a steering post, illustrating the mounting of the indicator operating mechanism thereon.

Referring more in detail to the drawings:

1 designates an automobile of any ordinary type and comprising a wind shield 2.
Mounted on the frame of the wind shield, at opposite ends thereof, are brackets 3—3' that extend laterally from the frame and carry vertical studs 4—4', between spaced arms 5—5', at the ends of the brackets. Pivotally mounted on said studs, between the bracket arms, are indicators 6—6', preferably constructed to resemble a human hand, for the reason that it has become a custom with drivers of automobiles to project their arms from the sides of the vehicle to indicate the direction in which their car is about to turn, the brackets 3—3' being preferably curved forwardly in order to provide space in front of the wind shield in which the indicator hands may lie without contacting the shield when they are at one limit of their movement.

Connected with one of the indicator hands is a spring 7, the opposite end of which is connected with a bolt 8, on the bracket, the parts being so arranged that the spring will urge the indicator hand away from the wind shield and to a position where it points laterally from the vehicle, the arm carrying the spring having suitable connection with an operating device to hold the arm against tension of the spring.

In the preferred construction, the connection of the hand 6 with the operating device comprises a cord or cable 10 that is attached to the opposite hand 6', so that when the hand 6 is moved outwardly to indicating position, the hand 6' will follow at a right angle to the line of travel but in front of the wind shield, where it cannot be observed by a trailing car and cannot indicate to a crossing officer or a person approaching from the opposite direction.

The cord or cable 10 runs over a pulley 11, mounted on the hand bracket 3', and over other suitable pulleys 13 that are mounted on the vehicle and are arranged to carry the connection to a point convenient to the operator of the car, where it is connected with the end of a rod 15, which is slidably mounted in a barrel 16, that is fixed to a suitable part of the vehicle, the present illustration showing the barrel attached to the edge of the vehicle frame, although such mounting is not essential. The barrel 16 has a staggered slot 17 and fixed to the rod and projecting through the slot in the barrel is a handle member 18, having a shank 19 adapted to travel within the slot and for seating back of the shoulders 20—21 therein, to hold the cable against the tension of the spring 7. The cable 10 is so connected with the arm 6' that a slight longitudinal movement of the cable will move the arm through an extended arc of a circle, and the shoulders 20—21 are so arranged in relation to the movement of the arm that movement of the shank 19 from one shoulder to the other will throw the arm through substantially ninety degrees, the connections being such that when the shank 19 engages the forward end of the slot 17, the spring will hold the indicator hands so that they project at right angles to the line of travel and in one direction, and when the shank engages the shoulder of the slot 21 at the opposite end of the barrel, the hands will be projected at right angles to the line of travel and in the other direction, the intermediate shoulder 20 holding the hands at an intermediate position wherein they point directly forward over the car.

In Fig. V I have illustrated a modified operating device consisting of a clamp 23 which is attached to the steering post 24 and carries a quadrant 25. Pivotally mounted on the clamp is a lever 26 adapted for travel along the steering wheel and connected with the cable 10, the said cable being run through a pulley so that when the lever is moved in one direction it will pull on the cable to actuate the same against the tension of the operating spring, and when moved in the other direction it will release the cable so that hands may be moved in the other direction.

Assuming the indicator parts to be constructed as described and assembled on an automobile, the spring for actuating the indicator arm will normally tend to urge the arms toward one side of the automobile, such tendency being restrained however, by the operating device which is normally retained in intermediate or neutral position, wherein they extend forwardly in the line of travel of the car. If the driver wishes to turn the car to the right he releases the actuating device so that the spring may pull the hands laterally to throw the right hand indicator hand outwardly from the car to a right angle thereto, so that a person approaching the car, a pedestrian about to cross the street, a traffic officer, or a person following the car may know that the car carrying the indicator is to turn to the right at the next corner and may act accordingly to avoid accidents.

After the vehicle has turned the corner and again assumes a straight line travel, the operating device is pulled back to intermediate position against the tension of the spring. Should the driver wish to turn his car to the left he pulls the operating handle back to the last notch so that the hands move to the left against the tension of the spring, and are held in such position by the shank seating in the last notch in the barrel slot, the indication being the same as that for the right hand turn except for the direction that is indicated by the opposite position of the hands.

While I have described a specific construction, mounting, and combination of the indicator on a vehicle, it is apparent that this has been merely to better illustrate the construction and principle of the invention, and should not be considered a limitation of its scope.

Having thus described my invention, what I claim as new therein, and desire to secure by Letters-Patent, is:

1. The combination with the windshield of a motor vehicle, of brackets mounted at the opposite side edges of the windshield and curved outwardly and forwardly therefrom, indicating devices pivotally mounted on vertical axes at the outer ends of said brackets, a spring connected with one of said brackets and with one of the indicating devices, to urge said device outwardly, connection between said devices, an operating mechanism connected with the other device, whereby both of the devices may be moved to neutral or a second indicating position against the tension of said yielding means.

2. The combination with the windshield of a motor vehicle, of a bracket mounted at each side edge of the windshield and curved laterally and forwardly therefrom, an indicating device mounted on each bracket, a spring connected with one of the brackets and with the adjacent indicating device, and arranged to urge said device to an indicating position at the side of the vehicle, connection between said devices, whereby the devices are moved synchronously and in the same direction, an operating mechanism including a flexible member, connected with the second indicating device, whereby both of the devices may be moved against the tension of said spring.

3. The combination with a windshield of a motor vehicle, of a bracket mounted at each side of the windshield, and extended laterally and forwardly therefrom, indicating devices mounted on vertical axis at the outer end of the bracket, connection between said indicating devices, a spring connected with all of the devices and arranged to urge both of the devices to one position transversely of the vehicle, whereby one of the devices extends laterally from the edge of the windshield, and the other extends in front of the windshield, an operating mechanism including guide pulleys mounted on the vehicle and one of the brackets and a flexible member run over said pulleys and connected with one of the indicating devices, whereby both of the indicating devices may be moved against the tension of said spring.

4. The combination with the windshield of a motor vehicle, of a bracket mounted at each side of the windshield, an indicating device pivotally mounted at the outer end of each bracket, a spring connected with one of the indicating devices, and arranged to urge the same laterally to indicating position, a flexible member run through the other device and attached thereto and to the device having the spring connection, and guide pulleys on one of the brackets and on the vehicle, for the purpose set forth.

In testimony whereof I affix my signature.

PARMER DORSEY.